(12) United States Patent
Sone et al.

(10) Patent No.: US 8,019,228 B2
(45) Date of Patent: *Sep. 13, 2011

(54) OPTICAL SWITCHING TRANSMISSION SYSTEM WITH TIMING CORRECTION

(75) Inventors: Kyosuke Sone, Kawasaki (JP); Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 709 days.

This patent is subject to a terminal disclaimer.

(21) Appl. No.: 11/984,426

(22) Filed: Nov. 16, 2007

(65) Prior Publication Data

US 2008/0159748 A1   Jul. 3, 2008

(30) Foreign Application Priority Data

Dec. 27, 2006  (JP) .................................. 2006-353133

(51) Int. Cl.
| | | |
|---|---|---|
| H04B 10/00 | (2006.01) | |
| G02F 1/00 | (2006.01) | |
| G02F 2/00 | (2006.01) | |
| H01S 3/00 | (2006.01) | |
| H04J 14/00 | (2006.01) | |
| H04J 3/06 | (2006.01) | |
| H04J 14/02 | (2006.01) | |

(52) U.S. Cl. .................. 398/154; 398/7; 398/8; 398/79; 370/507

(58) Field of Classification Search ........................ None
See application file for complete search history.

(56) References Cited

U.S. PATENT DOCUMENTS

| | | | | |
|---|---|---|---|---|
| 4,912,706 A * | 3/1990 | Eisenberg et al. | ............ | 370/507 |
| 5,600,466 A * | 2/1997 | Tsushima et al. | ............... | 398/79 |
| 5,712,932 A * | 1/1998 | Alexander et al. | ............... | 385/24 |
| 6,512,804 B1 * | 1/2003 | Johnson et al. | ............... | 375/372 |
| 6,798,991 B1 * | 9/2004 | Davis et al. | ..................... | 398/19 |

FOREIGN PATENT DOCUMENTS

| | | |
|---|---|---|
| JP | 2-186898 | 7/1990 |
| JP | 2001-217818 A | 8/2001 |

OTHER PUBLICATIONS

Japan Patent Office, Official Action mailed Apr. 19, 2011, in counterpart Japanese Patent Application No. JP2006-353133, English-language translation provided.

* cited by examiner

*Primary Examiner* — Ken N Vanderpuye
*Assistant Examiner* — Darren E Wolf
(74) *Attorney, Agent, or Firm* — Fujitsu Patent Center

(57) ABSTRACT

An optical transmission system capable of time difference correction without increasing guard times, thereby improving optical packet transmission efficiency. An optical switching processor sets identical switching timing for input ports thereof such that optical signals input from the input ports are switched at the same timing. During initialization, a time difference corrector transmits an optical dummy packet to an optical switch node, and detects synchroneity of the optical dummy packet returned thereto after being switched by the optical switch node. If synchronization error is detected, the time difference corrector adjusts the output timing of the optical dummy packet so that the timing of arrival of the optical dummy packet at the optical switching processor may coincide with the switching timing of the optical switching processor, to thereby correct the time difference between the switching timing and the arrival timing.

2 Claims, 14 Drawing Sheets

US 8,019,228 B2

OPTICAL SWITCHING TRANSMISSION SYSTEM WITH TIMING CORRECTION

CROSS-REFERENCE TO RELATED APPLICATIONS

This application is based upon and claims the benefits of priority from the prior Japanese Patent Application No. 2006-353133 filed Dec. 27, 2006, the entire contents of which are incorporated herein by reference.

BACKGROUND OF THE INVENTION

1. Field of the Invention

The present invention relates to optical transmission systems, and more particularly, to an optical transmission system for switching optical packets for transmission.

2. Description of the Related Art

In recent years, technology called optical interconnect has been researched and developed. Optical interconnect is a generic term referring to optical data communications over very short distances and usually signifies optical communications over shorter distances than LANs.

Optical interconnect is roughly classified into three types of optical interconnection, namely, optical interconnection between devices (such as communication between personal computers), optical interconnection between boards (communication between printed boards), and optical interconnection within a board (communication within a printed board). Conventional metal interconnection is associated with problems such as transmission loss and constraints on transmission bandwidth, but by using optical fibers, attenuation of signal strength and transmission bandwidth can be remarkably improved.

Meanwhile, the performance of CPUs has been noticeably advancing in recent years. There is, however, a considerable gap between the rate of advancement of LSI chips such as CPUs and that of peripheral technology associated with electrical wiring on printed boards. Also, with the rapid, unceasing improvement in the performance of LSI chips, the number of input/output pins necessary for exchanging signals has become as large as several thousands.

With techniques deriving from the existing electrical wiring technology, it is impossible to cope with such an enormous number of pins. For this reason, in-board optical interconnect has been attracting attention as a breakthrough in solving the problem of wiring bottleneck.

Because of the wide transmission band characteristic, application of optical interconnect to other fields is also pursued, such as signal switching in a parallel computer system including supercomputers connected to one another or in high-speed routers, in order to avoid the bottleneck (bandwidth or resources) of the electrical wiring technology.

Many of optical interconnect systems introduced until now adopt switching techniques in which optical signals are once converted to electrical signals for switching. With this configuration, however, broadening of the bandwidth entails increase in the number of switching ports. Accordingly, attempts are being made to realize optical packet switches whereby optical signals are directly switched, thereby to reduce the scale of switches.

As conventional optical switch-related techniques, a technique of synchronizing an optical communication network to lessen variations in frame reception timing of nodes has been proposed (e.g., Unexamined Japanese Patent Publication No. H02-186898 (pages 646 to 648, FIG. 5)).

In cases where optical packet switching is carried out on the optical interconnect system, optical packets arrive at the respective input ports of the optical switch at different times.

A buffer device (delay device) capable of retaining an optical packet as it is and compensating for an arbitrary arrival time difference does not exist. Conventionally, therefore, in order to correct arrival time differences of incoming packets, a guard time has been used in conjunction with the optical packet transfer control. However, the guard time is a non-transmission time period carrying no information, and since the guard time is lengthened with increase in the arrival time difference, a problem arises in that the optical packet transmission efficiency noticeably lowers.

FIG. 12 illustrates the problem caused by the arrival time differences of optical packets. An optical transmission system 5 includes transmitters 51 to 53, receivers 54 to 56, and an optical switch 57. Optical packets transmitted from the transmitters 51 to 53 are switched by the optical switch 57 to be sent to the receivers 54 to 56. Each of the optical packets transmitted from the transmitters 51 to 53 has guard times provided at the head and tail thereof.

The optical switch 57 switches, at identical switching timing, optical packets input thereto from its individual ports. In FIG. 12, rectangular wave-like dashed lines illustrate a packet switching process performed at the same switching timing irrespective of input ports, wherein the optical packets are switched at timing t1 and are output at timing t2.

The optical packet p1 transmitted from the transmitter 51 fits in the timing range t1, including the guard time provided at each end thereof. Accordingly, the optical packet p1 is normally switched at the timing t1 and output at the timing t2 to the receiver 54.

On the other hand, the optical packet p2 transmitted from the transmitter 52 arrives at the optical switch 57 after a delay of time d1, compared with the optical packet p1, so that only the former part of the payload of the optical packet p2 fits in the timing range t1, with the latter part of the payload being left behind. Consequently, only the former part of the payload is switched and is output to the receiver 55 at the timing t2.

The optical packet p3 transmitted from the transmitter 53 arrives at the optical switch 57 earlier than the optical packet p1 by time d2, so that only the latter part of the payload of the packet p3 fits in the timing range t1, with the former part of the payload being left out. Thus, only the latter part of the payload is switched and is output to the receiver 56 at the timing t2.

In order for the optical packets p2 and p3 to be switched normally without any part of their payloads being lost, it is necessary that the payloads of the individual optical packets be shortened in advance to secure longer guard time intervals.

Thus, in the conventional optical transmission system 5, where the arrival time differences of optical packets are large relative to the switching timing of the input ports of the optical switch 57, the guard time interval for correcting the arrival time differences needs to be set long, and since a longer guard time interval entails a corresponding decrease in the transmittable amount of data, a problem arises in that the data transfer efficiency lowers.

On receiving optical packets switched in the aforementioned manner, the receivers extract and recover clock signals from the received optical packets. The conventional optical transmission system 5 is also associated with a problem that the clock signals extracted from the individual optical packets involve a bit phase shift.

In the optical transmission system 5, burst optical packets are received and the clock signals and data are recovered from the respective optical packets. Even if the aforementioned arrival time differences of optical packets transmitted from different terminal nodes could be corrected, the bits still remain unadjusted, with the result that electrical signals recovered from the optical packets involve a bit phase shift associated with each packet.

FIG. 13 illustrates the manner of how optical packets are received. In the illustrated optical transmission system 5, optical packets #1 to #3 transmitted from the transmitters 51 to 53, respectively, are switched by the optical switch 57 to be sent to the receiver 54. The receiver 54 receives the switched optical packets #1, #2 and #3 in this order.

FIG. 14 shows bit phase shifts. The receiver 54 extracts a clock signal ck1 from the received optical packet #1, then extracts a clock signal ck2 from the received optical packet #2, and extracts a clock signal ck3 from the received optical packet #3.

The clock signals ck1 to ck3 extracted from the respective optical packets #1 to #3 should originally be synchronous (where the three optical packets #1 to #3 altogether represent a single piece of information, for example, the clock signals extracted from the optical packets #1 to #3 must be synchronous). However, because of differences in environmental condition between the optical fiber transmission paths from the transmitters 51 to 53 to the receiver 54, for example, the optical packets transmitted over the optical fiber transmission paths via the optical switch 57 develop bit-level phase shifts, causing synchronization error of the clock signals ck1 to ck3 extracted from the optical packets.

Thus, in cases where burst optical packets are received and clock signals are extracted from the respective optical packets, the extracted clock signals involve bit phase shifts, giving rise to a problem that data cannot be recovered with high accuracy.

SUMMARY OF THE INVENTION

The present invention was created in view of the above circumstances, and an object thereof is to provide an optical transmission system whereby even large arrival time differences of optical packets can be corrected without increasing guard times and also bit phase shifts can be compensated for, thereby improving optical packet transmission efficiency.

To achieve the object, there is provided an optical transmission system for performing optical transmission. The optical transmission system comprises an optical switch node and a plurality of terminal nodes. The optical switch node includes an optical switching processor. The optical switching processor sets substantially identical switching timing for all input ports thereof such that optical signals input from the input ports are substantially switched at identical timing. The terminal nodes are connected to the respective input ports and each include a time difference corrector. During initialization, the time difference corrector transmits an optical dummy packet to the optical switch node and detects synchroneity of the optical dummy packet returned thereto after being switched by the optical switch node. If synchronization error is detected, the time difference corrector adjusts output timing of the optical dummy packet so that timing of arrival of the optical dummy packet at the optical switching processor may coincide with the switching timing of the optical switching processor, to correct a time difference between the switching timing and the arrival timing.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
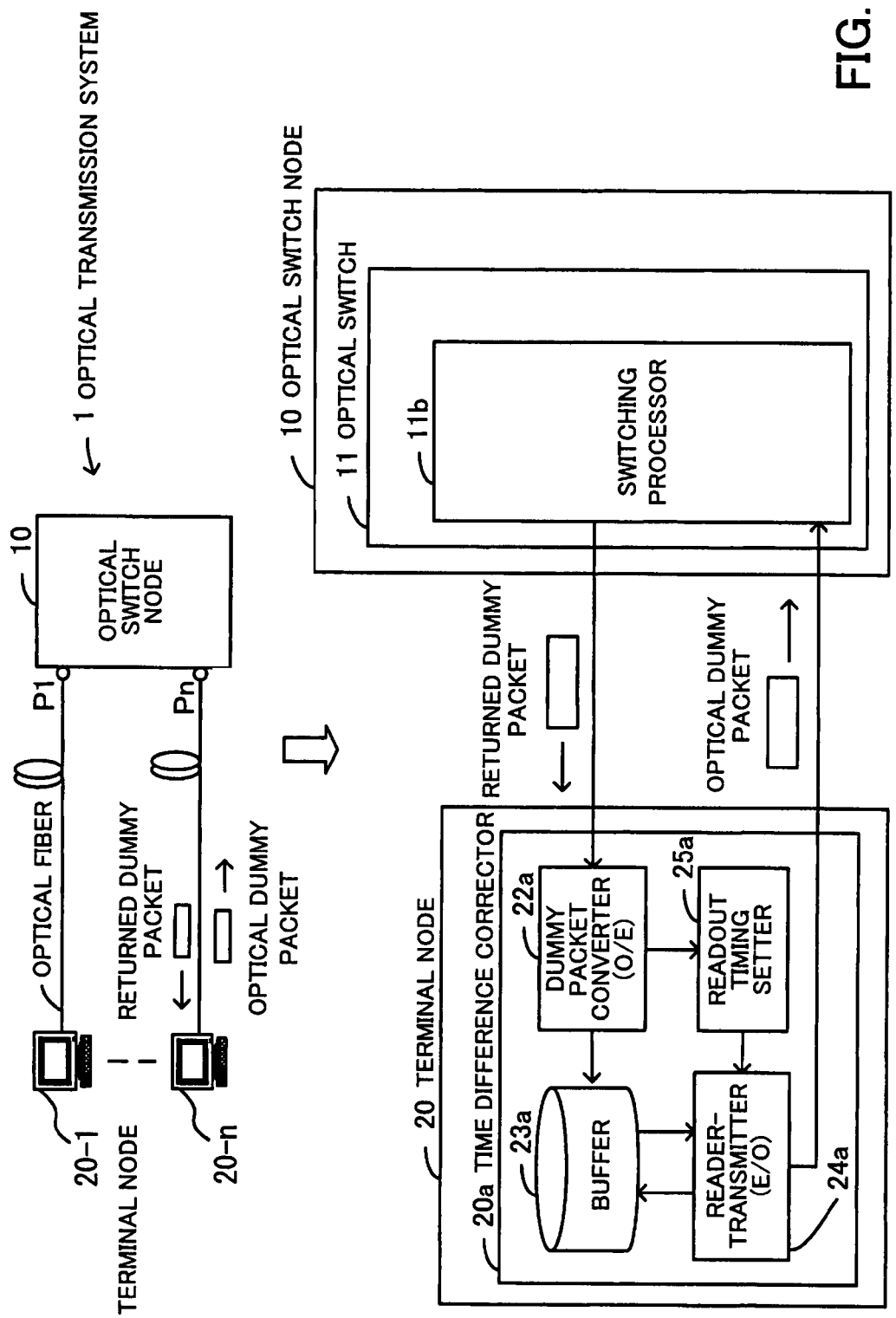
FIG. 1 illustrates the principle of an optical transmission system.

Preferred embodiments of the present invention will be described below with reference to the accompanying drawings, wherein like reference numerals refer to like elements throughout. FIG. 1 illustrates the principle of an optical transmission system. The optical transmission system 1 is a system to which optical interconnect is applicable, and includes an optical switch node 10 and terminal nodes 20-1 to 20-n (when referred to generically, "terminal node 20") connected to respective input ports P1 to Pn of the optical switch node 10 by optical fibers. An optical packet output from a certain terminal node is switched directly in the form of an optical signal by the optical switch node 10 and transmitted to a predetermined terminal node.

The optical switch node 10 has an optical switch 11 including an optical switching processor 11b. The optical switching processor 11b sets identical switching timing for all input ports P1 to Pn, and accordingly, optical signals input from the input ports P1 to Pn are switched at the same timing.

The terminal node 20 (corresponding to a supercomputer or the like) includes a time difference corrector 20a, which comprises a returned dummy packet converter (O/E) 22a, a buffer 23a, a reader-transmitter (E/O) 24a, and a variable readout timing setter 25a.

During initialization, the buffer 23a generates and stores a dummy packet (test packet for time difference correction), which is an electrical signal. During in-service operation, the buffer stores service packets which also are electrical signals but contain service information.

When transmitting an optical dummy packet to the optical switch node during the initialization, the reader-transmitter 24a reads out the dummy packet from the buffer 23a in accordance with readout timing, then converts the dummy packet to an optical signal to generate an optical dummy packet, and sends the generated optical dummy packet to the optical switching processor 11b.

The returned dummy packet converter 22a receives the optical dummy packet returned thereto after being switched by the optical switch node, and converts the received optical dummy packet to an electrical dummy packet. The variable readout timing setter 25a detects synchroneity of the returned dummy packet and, if synchronization error is detected, varies the readout timing of the reader-transmitter 24a until synchroneity is established.

The reader-transmitter 24a again reads out the dummy packet from the buffer 23a in accordance with the varied readout timing, then converts the dummy packet to an optical signal to generate an optical dummy packet, and transmits the generated optical dummy packet to the optical switch 11.

The readout timing is repeatedly varied until the optical dummy packet fits in the switching time range of the optical switch 11 and thus can be switched normally (until synchroneity of the returned dummy packet is detected).

In subsequent in-service operation of the system carried out after synchroneity of the returned optical dummy packet is detected, the reader-transmitter 24a reads out a service packet, which is an electrical signal, from the buffer 23a in accordance with the synchronized readout timing, converts the service packet to an optical signal to generate an optical packet (optical packet containing actual service information, as distinct from the optical dummy packet), and transmits the generated optical packet to the optical switch 11, thereby performing normal optical communication.

In this manner, during the initialization of the system, time difference correction using the optical dummy packet is executed to adjust the optical packet transmission timing of the terminal node 20 so that the arrival time of the optical packet transmitted from the terminal node 20 may be synchronized with the switching timing of the input ports P1 to Pn of the optical switch node 10. Accordingly, during the in-service operation of the system, optical packets are normally switched without any part of their fields being lost.

In the above instance, the time difference corrector 20a transmits a single optical dummy packet to the optical switch node 10 and corrects the time difference on the basis of the reception timing of the optical dummy packet returned thereto after being switched by the optical switch node 10. Alternatively, an optical continuous signal composed of multiple optical dummy packets may be sent to the optical switch node 10 during the initialization.

In this case, the time difference corrector 20a corrects the time difference on the basis of the reception timing of optical dummy packets returned thereto after being segmented from the optical continuous signal by the optical switching processor 11b in accordance with the switching timing.

Figure 2:
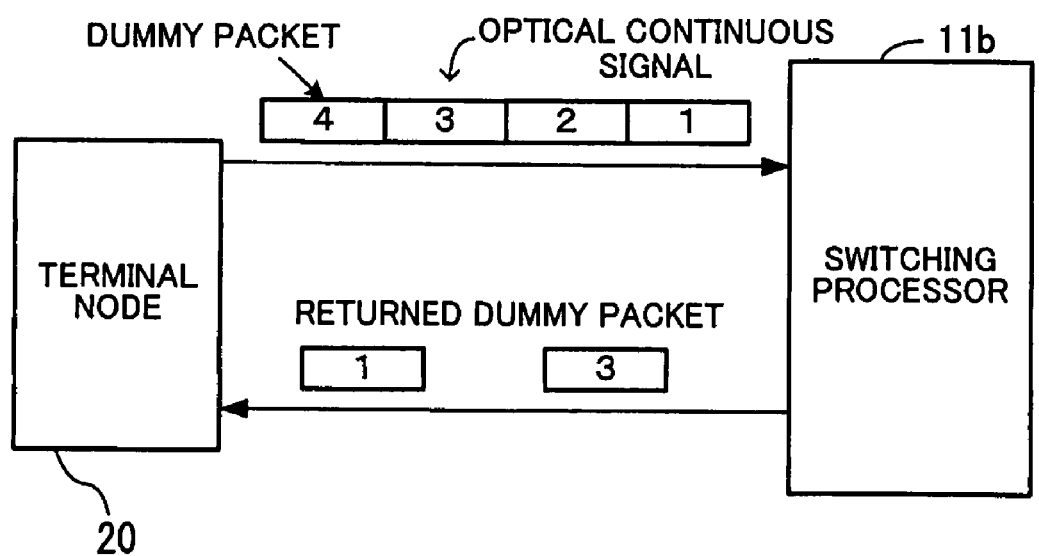
FIG. 2 shows the manner of how optical dummy packets constituting an optical continuous signal are returned.

FIG. 2 illustrates the manner of how optical dummy packets constituting such an optical continuous signal are returned. The optical continuous signal composed of multiple optical dummy packets and transmitted from the terminal node 20 is segmented by the optical switching processor 11b in accordance with the switching timing (in the figure, into packets 1 and 3) and returned to the terminal node 20.

If there is a time difference between the switching timing of the optical switching processor 11b and the input timing at which the optical continuous signal constituted by multiple optical dummy packets is input to the optical switching processor 11b, then optical dummy packets whose head or tail is lost due to the switching action are returned to the terminal node 20, allowing the terminal node to detect a synchronization error.

When such a synchronization error is detected, the dummy packets are read from the buffer 23a with the readout timing changed, the read dummy packets are converted to optical signals to generate an optical continuous signal constituted by multiple optical dummy packets, and the optical continuous signal is transmitted to the optical switch 11. This control action is repeated until synchroneity is established, as in the case of FIG. 1.

Figure 3:
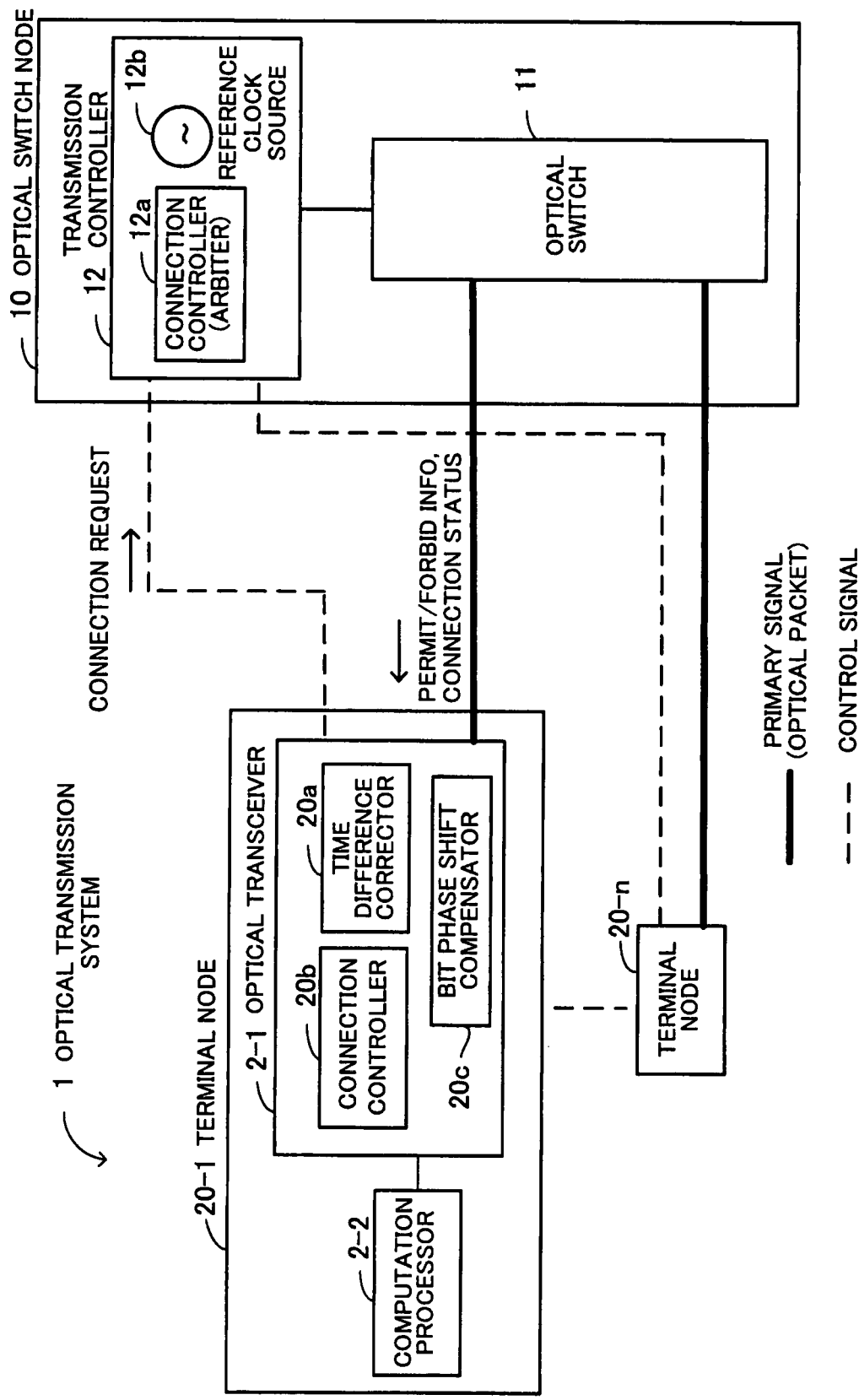
FIG. 3 shows an entire system configuration including an optical switch node and terminal nodes.

An entire configuration of the system including the optical switch node 10 and the terminal node 20 will be now described with reference to FIG. 3. The terminal nodes 20-1 to 20-n are each connected to the optical switch node 10 by an optical fiber, as shown in FIG. 1, and optical packets, which are a primary signal, and a control signal are exchanged between each of the terminal nodes 20-1 to 20-n and the optical switch node 10 through the optical fiber (the control signal may alternatively be exchanged via an electric cable laid separately from the optical fiber).

The optical switch node 10 comprises the optical switch 11, also shown in FIG. 1, and an optical transmission controller 12. The optical transmission controller 12 includes an optical switch-side connection controller 12a (hereinafter referred to as arbiter 12a) and a reference clock source 12b, and globally controls the system including the optical switch 11 and the terminal nodes 20-1 to 20-n (the control performed includes centralized control of optical packet routing information).

The arbiter 12a takes care of port-to-port connection between the optical switch node 10 and each of the terminal nodes 20-1 to 20-n, as well as drive control of the optical switch 11. The reference clock source 12b is a master clock of the system, and a clock signal generated by the reference clock source 12b is distributed to the terminal nodes 20-1 to 20-n and the optical switch 11, so that the individual elements in the system operate in synchronism with the distributed clock signal.

The terminal node 20 comprises an optical transceiver 2-1 and a computation processor 2-2. The optical transceiver 2-1 includes a terminal-side connection controller 20b and a bit phase shift compensator 20c, besides the time difference corrector 20a, also shown in FIG. 1. The optical transceiver 2-1 is configured like a line card, for example, and can be freely inserted into and detached from the terminal nodes 20-1 to 20-n.

The computation processor 2-2 has a user interface and acts as a central computer of the terminal node 20 for performing various information processing. The terminal-side connection controller 20b takes care of the port-to-port connection between the local terminal node and the optical switch node 10. The time difference corrector 20a is explained above with reference to FIG. 1, and therefore, explanation thereof is omitted. The bit phase shift compensator 20c receives optical packets burst from the optical switch node 10 and compensates for bit phase shifts of the individual optical packets (as described in detail later with reference to FIG. 11).

The following summarizes the port-to-port connection between the terminal node 20 and the optical switch 11. During the initialization prior to in-service operation, the terminal-side connection controller 20b transmits a port-to-port connection request to the arbiter 12a. On receiving a connection request from any of the ports (terminal nodes), the arbiter 12a decides a connection route based on the connection request, and sends port connection permit/forbid information to the terminal-side connection controller 20b of the corresponding terminal node.

The terminal-side connection controller 20b receives the port connection permit/forbid information and, if the port connection is permitted, transmits optical packets from the permitted port to the optical switch 11. The arbiter 12a notifies each terminal node of the status of currently established port-to-port connections, and also controls the route switching operation of the optical switch 11 such that switching of all input ports of the optical switch 11 takes place at the same timing.

The following describes the time difference correction performed by the time difference corrector 20a prior to in-service operation of the system, in order to correct the time difference between the timing of arrival at the optical switch 11 of the optical packet transmitted from the terminal node 20 and the switching timing.

Figure 4:
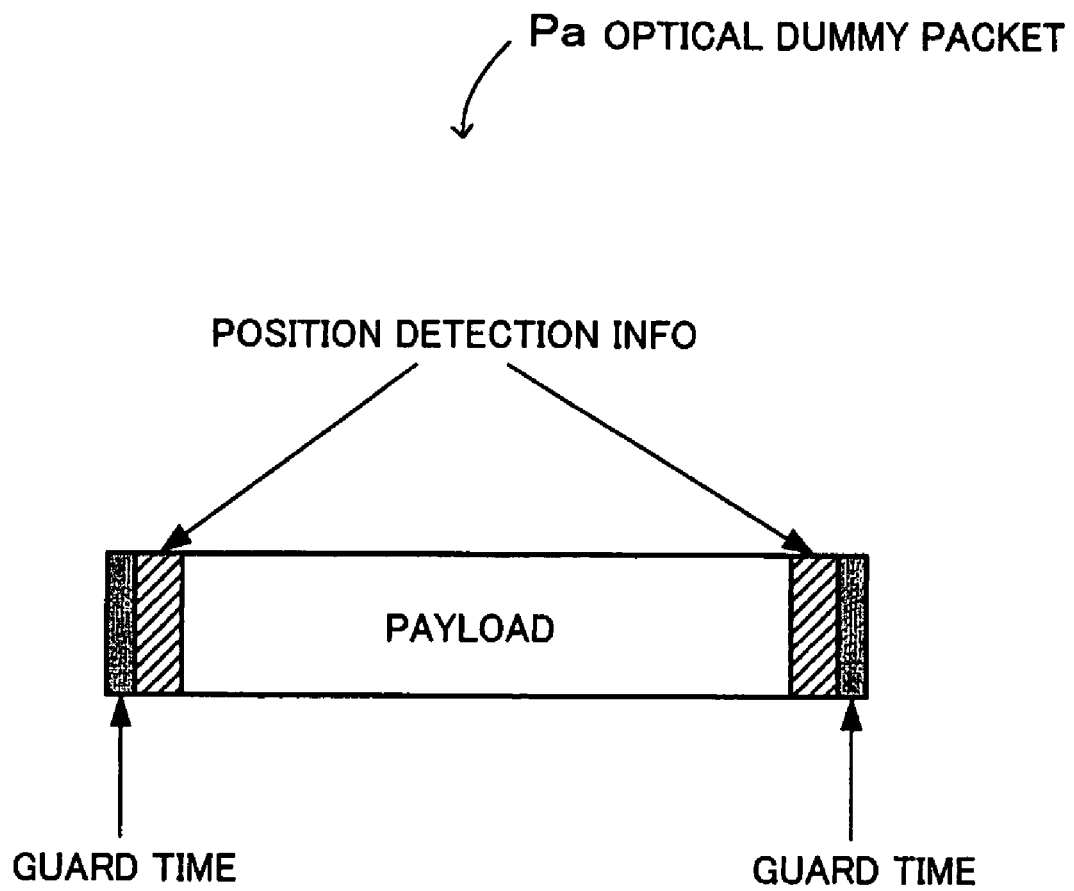
FIG. 4 shows the structure of the optical dummy packet.

FIG. 4 shows the structure of the optical dummy packet. The optical dummy packet Pa carries optical dummy packet position detection information at each of the head and tail of its payload, to enable detection of synchroneity of the optical dummy packet Pa. Also, guard times are provided so as to precede and succeed, respectively, the corresponding optical dummy packet position detection information (each guard time is a very short time interval added in order to compensate for fine jitters of data and is different from the conventional long-interval guard time provided for time difference correction). The optical dummy packet position detection information and the guard times are added by the reader-transmitter 24a (FIG. 1).

Figure 5:
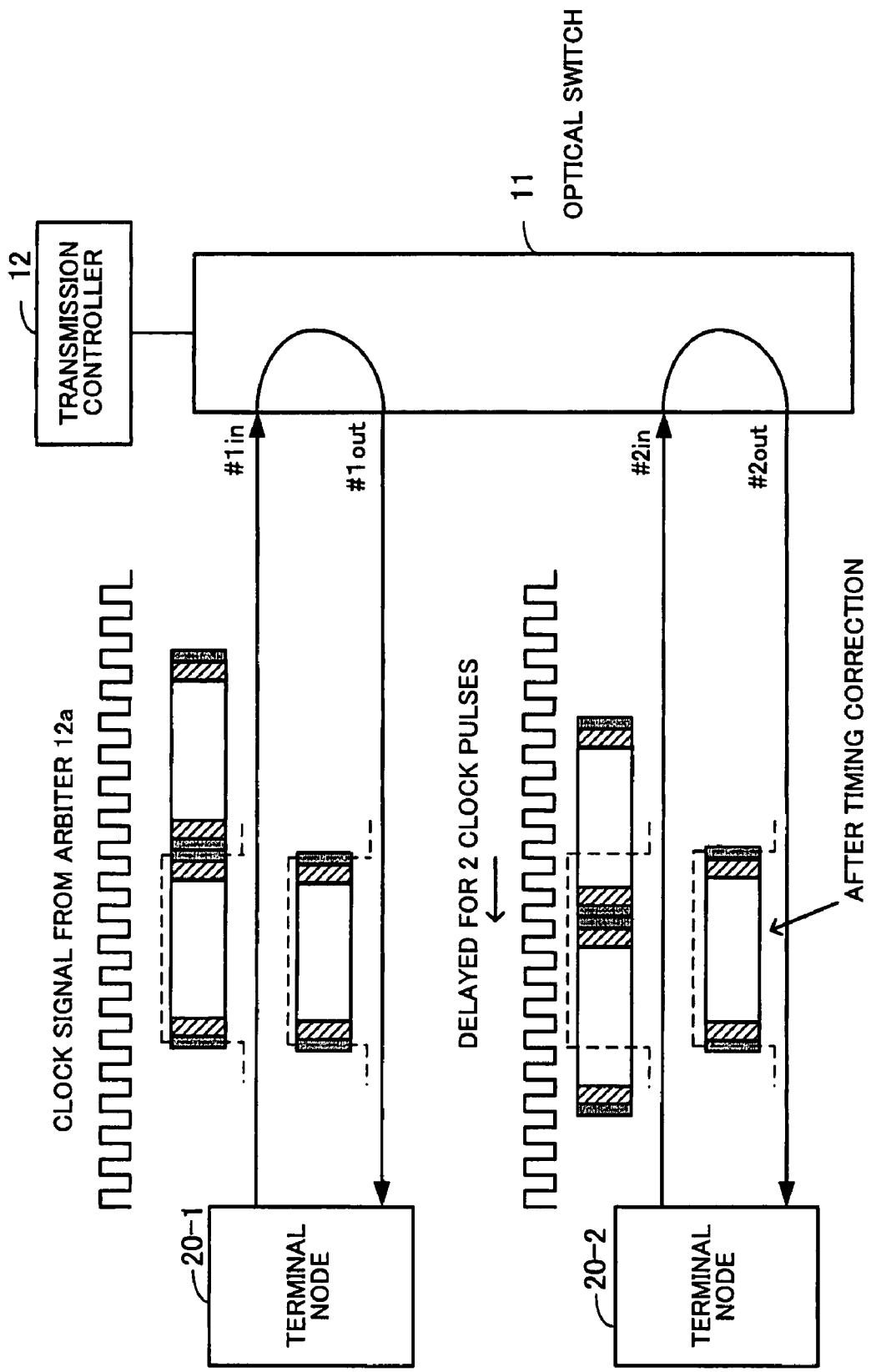
FIG. 5 illustrates time difference correction.

FIG. 5 illustrates the time difference correction. The optical switch 11 is connected with the terminal nodes 20-1 and 20-2, and the clock signal distributed from the optical transmission controller 12 is supplied to the terminal nodes 20-1 and 20-2 and the optical switch 11. Switching of input ports #1in and #2in of the optical switch 11 takes place at the same timing, and the switching timing is indicated in the figure by the rectangular wave-like dashed lines.

When connected to the optical switch node 10, the terminal nodes 20-1 and 20-2 each autonomously output an optical dummy packet or an optical continuous signal which is a succession of optical dummy packets. In the optical switch 11, the optical switching processor 11b (FIG. 1) switches the optical continuous signal or the optical dummy packet, and the switched optical dummy packet is returned to the corresponding terminal node.

(1) Time difference correction in the terminal node 20-1 (where normal switching can be effected since there is no time difference between the switching timing and the arrival timing).

On receiving the optical dummy packet switched by and returned from the optical switch 11, the time difference corrector 20a in the terminal node 20-1 converts the returned optical dummy packet to an electrical dummy packet and stores the electrical dummy packet in the buffer 23a.

Subsequently, the time difference corrector reads out the dummy packet in accordance with the current readout timing (timing generated based on the distributed clock signal) and converts the read dummy packet to an optical signal to generate an optical dummy packet, which is then transmitted to the optical switch 11.

The optical switch 11 switches the optical dummy packet received via the input port #1in and returns the packet via the output port #1out to be looped back to the terminal node 20-1. The time difference corrector 20a receives the thus-switched and looped-back optical dummy packet and detects synchroneity of the received packet. Specifically, synchroneity is determined by detecting the optical dummy packet position detection information at the head and tail of the returned optical dummy packet (in practice, synchroneity of the electrical dummy packet converted from the returned optical dummy packet is detected).

In the example shown in FIG. 5, the optical dummy packet is synchronized. Namely, if the time difference corrector 20a can normally detect the optical dummy packet position detection information provided at each of the head and tail of the optical dummy packet, then it means that the optical dummy packet transmitted from the terminal node 20-1 has fitted in the switching time range of the input port #1in, inclusive of the guard time at each end of the optical dummy packet, and thus has been normally switched by the optical switch 11.

From this it follows that there is no time difference between the timing of arrival at the optical switch 11 of the optical dummy packet transmitted from the terminal node 20-1 and the switching timing of the optical switch 11, proving that in subsequent in-service operation, optical packets may be read out and output from the terminal node 20-1 at the current readout timing.

(2) Time difference correction in the terminal node 20-2 (where normal switching cannot be effected since there is a time difference between the switching timing and the arrival timing).

On receiving the optical dummy packet switched by and returned from the optical switch 11, the time difference corrector 20a in the terminal node 20-2 converts the returned optical dummy packet to an electrical dummy packet and stores the electrical dummy packet in the buffer 23a.

Subsequently, the time difference corrector reads out the dummy packet in accordance with the current readout timing (timing generated based on the distributed clock signal) and converts the read dummy packet to an optical signal to generate an optical dummy packet, which is then transmitted to the optical switch 11.

The optical switch 11 switches the optical dummy packet received via the input port #2in and returns the packet via the output port #2out to be looped back to the terminal node 20-2. The time difference corrector 20a receives the thus-switched and looped-back optical dummy packet and detects synchroneity of the received packet. Specifically, synchroneity is determined by detecting the optical dummy packet position detection information at the head and tail of the optical dummy packet (in practice, synchroneity of the electrical dummy packet converted from the returned optical dummy packet is detected).

In the example shown in FIG. 5, the optical dummy packet is not synchronized. Namely, the optical dummy packet has been switched in the middle, failing to fit in a single switching time range.

On detecting such a synchronization error, the time difference corrector 20a repeatedly varies the readout timing until synchroneity is established so that the optical packet may fit in the switching time range and thus can be switched normally. In the illustrated example, the optical packet fits in the switching time range if delayed for a time period corresponding to two clock pulses of the distributed clock signal, and accordingly, the transmission timing (readout timing) of the optical dummy packet is delayed for two clock pulses.

As a result, the time difference between the arrival timing at the optical switch 11 of the optical dummy packet transmitted from the terminal node 20-2 and the switching timing of the optical switch 11 can be eliminated. In subsequent in-service operation, therefore, optical packets may be read out and output from the terminal node 20-2 in accordance with the corrected readout timing.

The following describes the case where a timeslot adjustment error occurs between the optical packets transmitted from the multiple terminal nodes 20-1 to 20-n and the switching process of the optical switch 11. In the above, the time difference between the readout timing of the single terminal node 20 and the switching timing of the optical switch 11 is corrected. There is a possibility, however, that a timeslot adjustment error occurs between the optical packets transmitted from the multiple terminal nodes and the switching process of the optical switch 11, and accordingly, such a timeslot adjustment error also needs to be corrected within the system.

Figure 6:
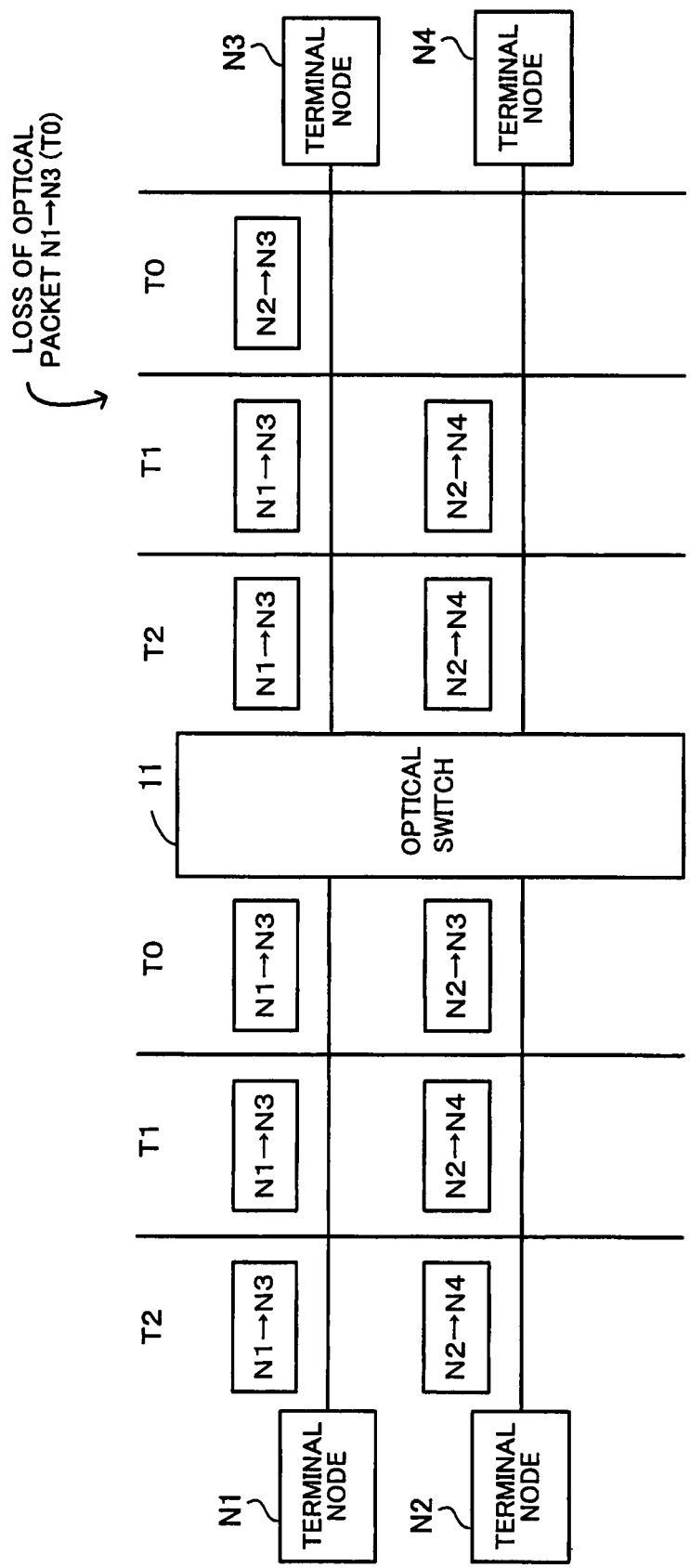
FIG. 6 illustrates a timeslot adjustment error between optical packets.

FIG. 6 illustrates a timeslot adjustment error between optical packets. The optical switch 11 is connected with terminal nodes N1 to N4. The terminal node N1 transmits, to the optical switch 11, optical packets addressed to the terminal node N3. The terminal node N2 transmits, to the optical switch 11, an optical packet addressed to the terminal node N3 as well as optical packets addressed to the terminal node N4.

The optical switch 11 switches the received optical packets to be output to the respective destination terminal nodes. With respect to input timeslots T1 and T2, the optical packets output from the terminal node N1 are addressed to the terminal node N3 (N1→N3), and the optical packets output from the terminal node N2 are addressed to the terminal node N4 (N2→N4). Accordingly, no contention occurs during the switching process, so that the optical packets are transmitted to their respective destinations in output timeslots T1 and T2.

With respect to input timeslot T0, however, the optical packet output from the terminal node N1 is addressed to the terminal node N3 (N1→N3), and also the optical packet output from the terminal node N2 is addressed to the same terminal node N3 (N2→N3), causing contention during the switching process for this timeslot.

In the example shown in FIG. 6, the optical packet (N2→N3) is switched and output to the terminal node N3 in the output timeslot T0, whereas the optical packet (N1→N3) is lost. The optical switch-side connection controller (arbiter), to which the packet send request is transmitted from each terminal node, performs arbitration control so that contention may not occur between the ports, and therefore, the packet loss mentioned above is caused due to displacement of timeslots.

Accordingly, in the optical transmission system 1 of the present invention, timeslot displacement that may possibly be caused between the optical packets transmitted from multiple terminal nodes and the switching process of the optical switch 11 also needs to be corrected, besides the time difference of the individual terminal nodes explained above with reference to FIGS. 1 through 5.

Figure 7:
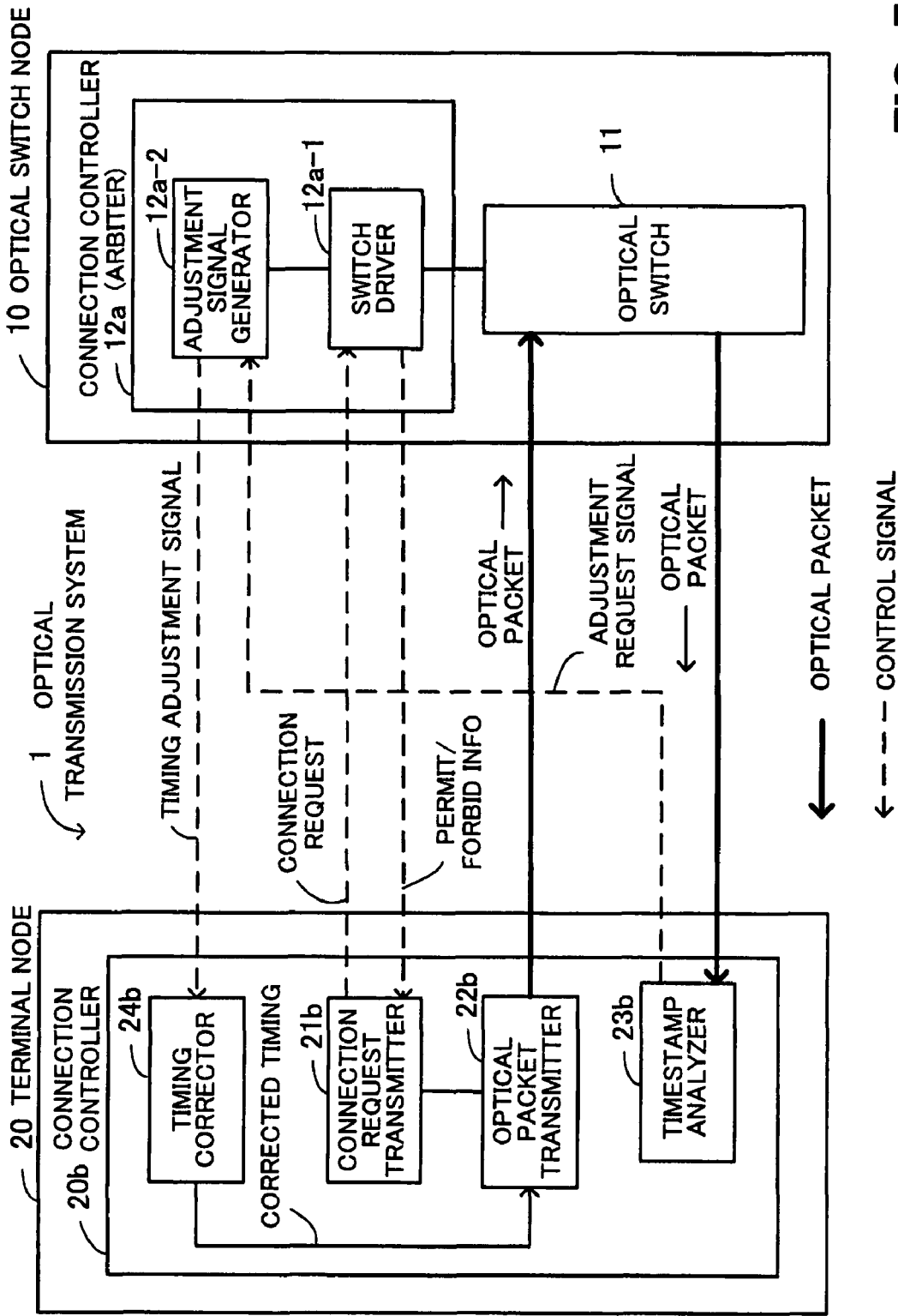
FIG. 7 shows the configuration of the optical switch node and terminal node.

The following describes the configuration and operation of the optical transmission system 1 capable of correcting such timeslot displacement. FIG. 7 illustrates the configuration of the optical switch node 10 and terminal node 20. In the figure, like reference numerals refer to like elements appearing in FIGS. 1 and 3, and it is to be noted that the illustration and the explanation given below are focused on the elements necessary for correcting the timeslot displacement (namely, the elements shown in FIGS. 1 and 3 are included also in the nodes but are not illustrated in FIG. 7).

The arbiter 12a includes a switch driver 12a-1 and a timing adjustment signal generator 12a-2. The switch driver 12a-1 receives a port-to-port connection request from the terminal node 20, then determines whether to permit the port connection, and transmits port connection permit/forbid information. The port-to-port connection request includes destination information indicative of a destination terminal node. Based on the destination information, the switch driver 12a-1 decides a switch connection route and controls the switching operation of the optical switch 11.

The timing adjustment signal generator 12a-2 receives a timing adjustment request signal from the terminal node 20 and outputs a timing adjustment signal to that terminal node 20 which is transmitting optical packets at such transmission timing as to cause contention between the input ports of the optical switch 11.

The terminal-side connection controller 20b includes a connection request transmitter 21b, an optical packet transmitter 22b, a timestamp analyzer 23b, and a timing corrector 24b. The connection request transmitter 21b identifies the destination node to which an optical packet is to be transmitted, and transmits a port-to-port connection request together with the destination information.

If the port-to-port connection with the optical switch 11 is permitted, the optical packet transmitter 22b transmits, to the optical switch 11, the optical packet affixed with a timestamp. The timestamp analyzer 23b receives switched optical packets and analyzes continuity of the timestamps. If it is judged as a result of the analysis that timeslot displacement has occurred between terminal nodes, the timestamp analyzer transmits a timing adjustment request signal to the timing adjustment signal generator 12a-2. The timing corrector 24b receives the timing adjustment signal from the optical switch node 10 and corrects the transmission timing of optical packets.

Figure 8:
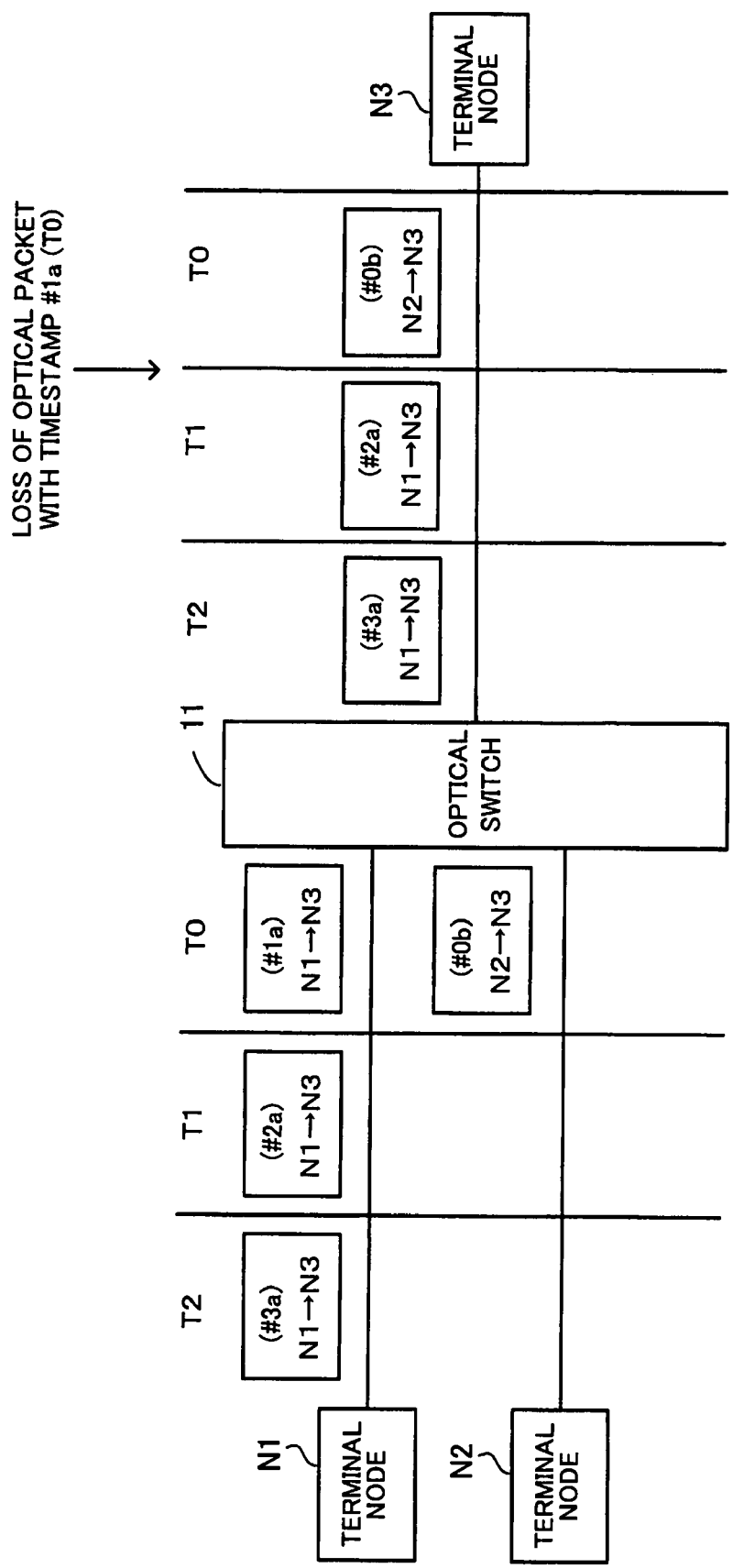
FIG. 8 shows a process of switching time-stamped optical packets.

Referring now to a specific example, operation of the system will be explained. FIG. 8 illustrates a process of switching time-stamped optical packets. The optical switch 11 is connected with the terminal nodes N1 to N3. The terminal nodes N1 and N2 transmit, to the optical switch 11, time-stamped optical packets addressed to the terminal node N3.

The terminal node N1 transmits optical packets to the optical switch 11 while affixing timestamps #0a, #1a, . . . to the respective packets. The optical packets should originally be output from the terminal node N1 such that the optical packets with the timestamps #0a, #1a and #2a arrive in the input timeslots T0, T1 and T2, respectively, but in the illustrated example, the optical packets are each transmitted one timeslot earlier than should be. Namely, the optical packet with the timestamp #1a arrives in the input timeslot T0, the optical packet with the timestamp #2a arrives in the input timeslot T1, and the optical packet with the timestamp #3a arrives in the input timeslot T2.

On the other hand, the terminal node N2 affixes a timestamp #0b to an optical packet, and this packet with the timestamp #0b arrives at the optical switch 11 in the input timeslot T0 (normal transmission).

The timestamp carries an identifier specifying the terminal node from which the corresponding optical packet has been transmitted (in this instance, the symbols "a" and "b" indicate the terminal nodes N1 and N2, respectively), and includes a sequence number (the packets are numbered "0", . . . , "n", for example).

In the illustrated example, contention occurs in the input timeslot T0 because there are two optical packets addressed to the same terminal node N3, and as a result, the optical packet with the timestamp #0b is output in the output timeslot T0 while the optical packet with the timestamp #1a is lost.

Figure 9:
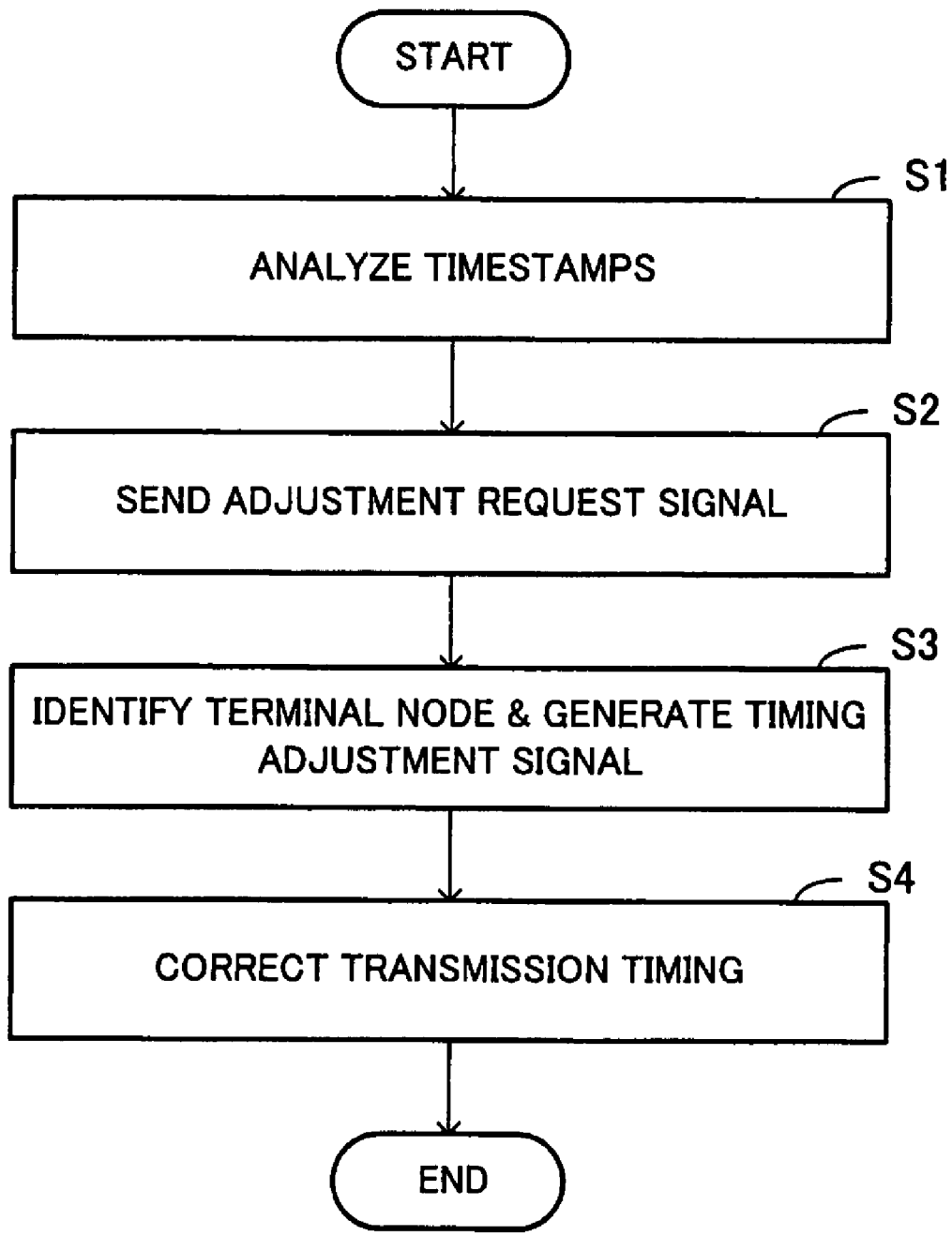
FIG. 9 is a flowchart showing a timing adjustment process.

FIG. 9 is a flowchart illustrating a timing adjustment process executed upon detection of the loss of the optical packet (N1→N3) with the timestamp #1a shown in FIG. 8.

S1: The timestamp analyzer 23b of the terminal node N3 receives the switched optical packets with the timestamps #0b, #2a and #3a, and analyzes continuity of the timestamps of these optical packets.

In this instance, the optical packet with the timestamp #2a is received subsequently to the optical packet with the timestamp #0b. The timestamp is so defined as to occur in the order "0", ..., "n", and accordingly, the timestamp analyzer judges that #1a is missing (also "a" indicates that the optical packet has been transmitted from the terminal node N1) and that timeslot displacement has occurred during the switching process for the optical packets with the timestamps #1a and #0b (i.e., in the input timeslot T0).

S2: The timestamp analyzer 23b transmits a timing adjustment request signal to the timing adjustment signal generator 12a-2 of the optical switch node 10. The timing adjustment request signal includes the identifier of the terminal node N1 whose optical packet transmission timing needs to be corrected, and the number of missing timestamps (in this instance, "1").

S3: On receiving the timing adjustment request signal, the timing adjustment signal generator 12a-2 recognizes that the node whose transmission timing needs to be corrected is the terminal node N1 and that the transmission timing needs to be corrected by one timeslot. Thus, the timing adjustment signal generator generates a timing adjustment signal including the number of timeslots to be corrected, and transmits the generated signal to the corresponding terminal node N1.

S4: In accordance with the received timing adjustment signal, the timing corrector 24b of the terminal node N1 corrects the optical packet transmission timing on a timeslot-by-timeslot basis. In this instance, the transmission timing is delayed for one timeslot.

Figure 10:
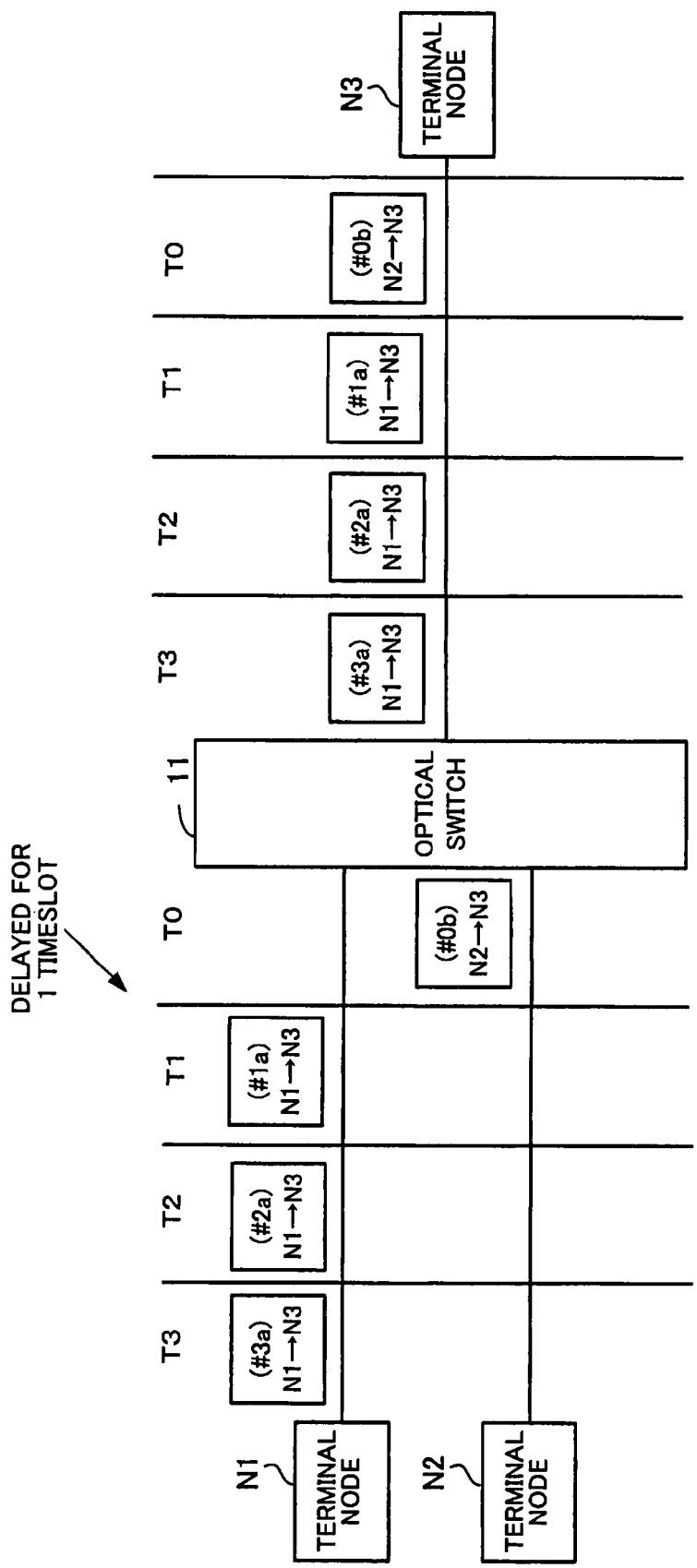
FIG. 10 shows a flow of optical packets after the adjustment of timeslot displacement.

FIG. 10 illustrates the flow of optical packets after the adjustment of timeslot displacement. The terminal node N1 transmits optical packets addressed to the terminal node N3 while delaying the transmission timing for one timeslot, compared with the current timing, as shown in the operation flow of FIG. 10. Consequently, no contention occurs in the input timeslot T0, enabling normal switching.

Figure 11:
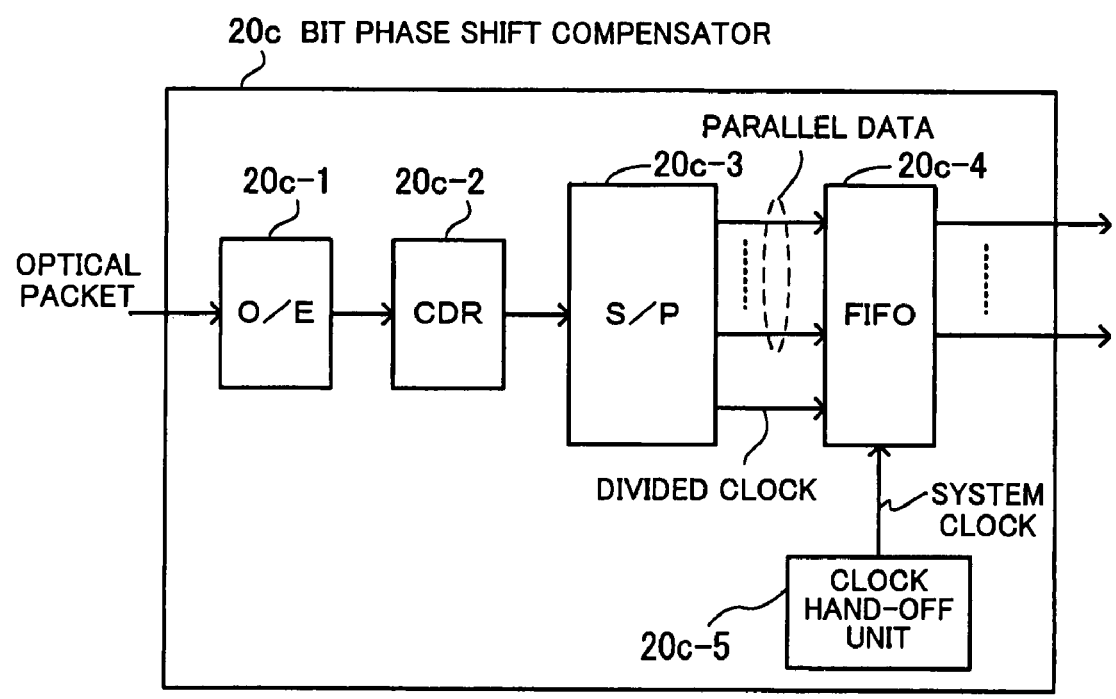
FIG. 11 shows the configuration of a bit phase shift compensator.
Figure 12:
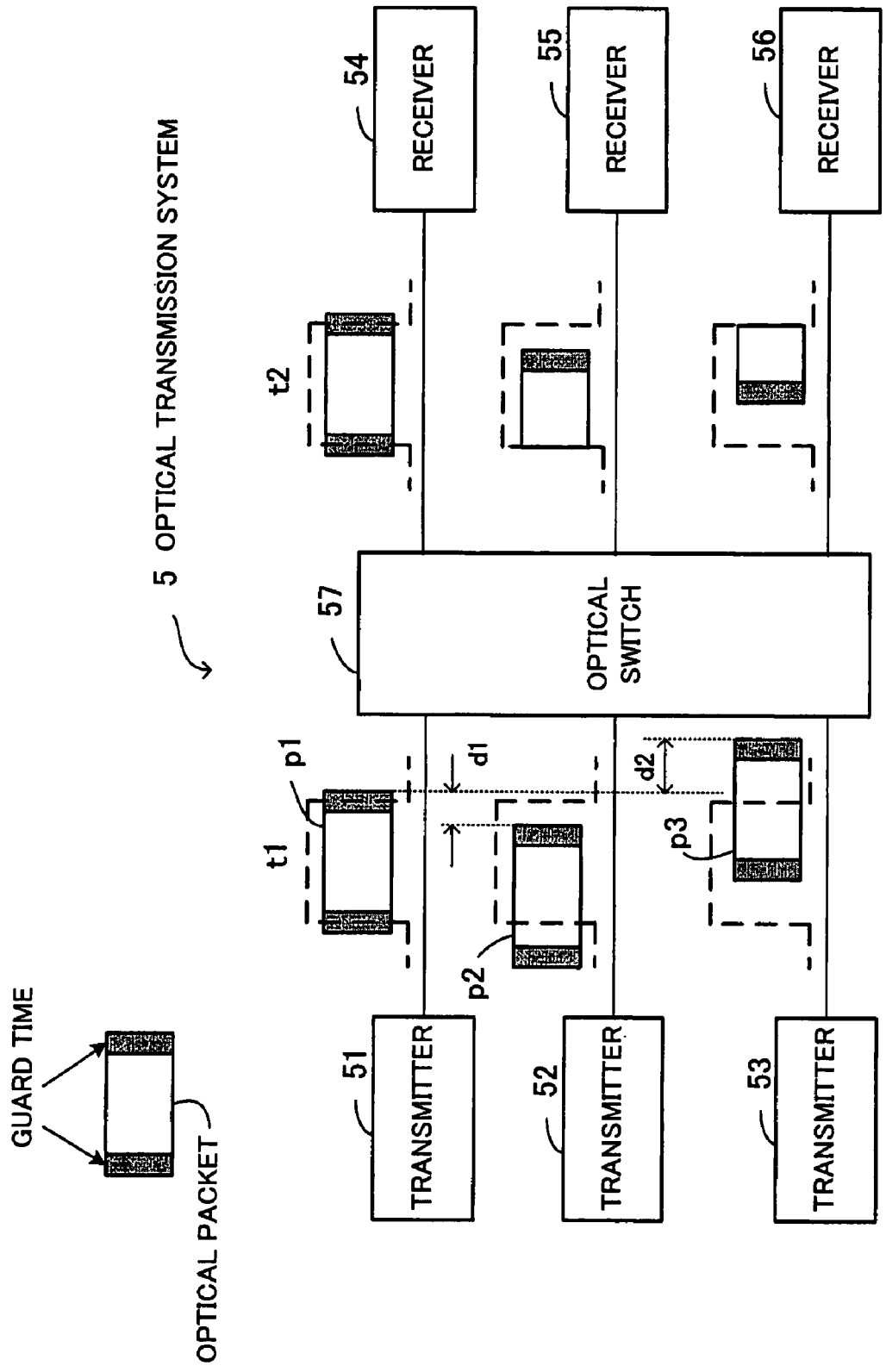
FIG. 12 illustrates a problem caused by arrival time differences of optical packets.
Figure 13:
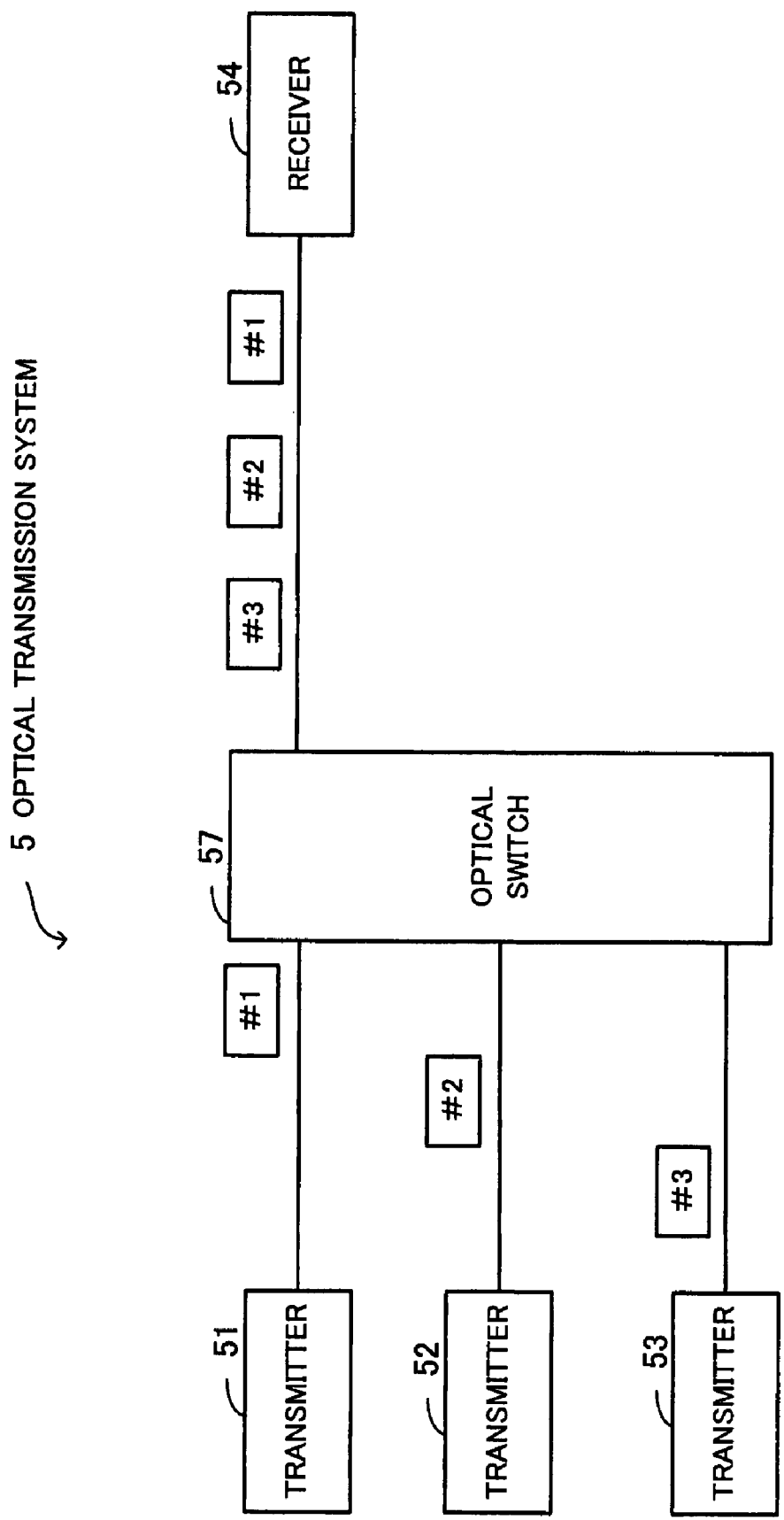
FIG. 13 shows the manner of how optical packets are received.
Figure 14:
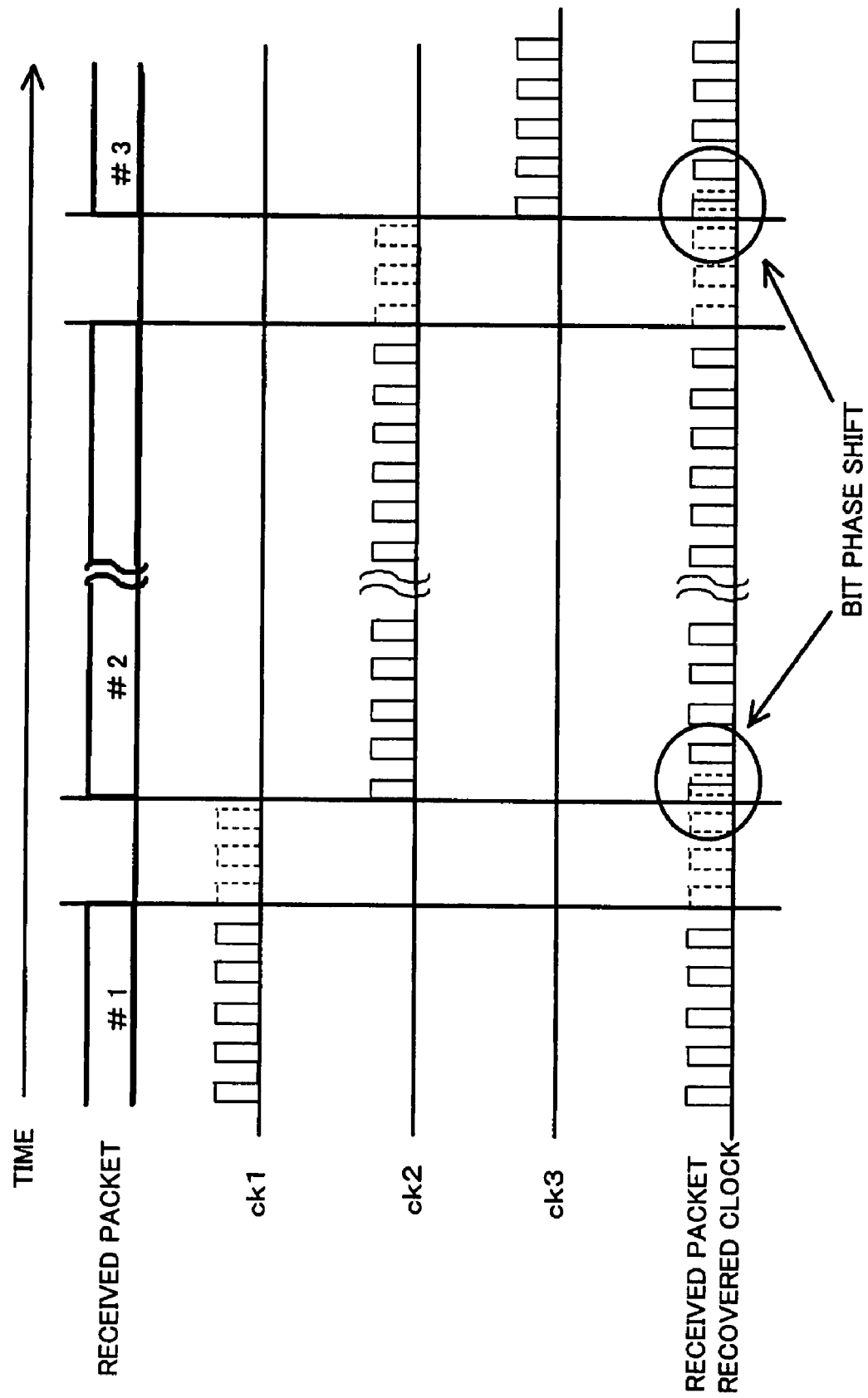
FIG. 14 illustrates bit phase shifts.

The bit phase shift compensator 20c will be now described. FIG. 11 shows the configuration of the bit phase shift compensator 20c. The bit phase shift compensator 20c comprises an O/E (Optical/Electrical) converter 20c-1, a CDR (Clock Data Recovery) unit (clock extractor) 20c-2, an S/P (Serial/Parallel) converter 20c-3, a FIFO (First In First Out) buffer 20c-4, and a clock hand-off unit 20c-5.

The O/E converter 20c-1 receives optical packets burst from the optical switch node 10 and converts each received optical packet to an electrical data signal. The CDR unit 20c-2 extracts a data clock signal from the data signal.

The S/P converter 20c-3 converts the data signal to N parallel data and also divides the frequency of the data clock signal by N (i.e., 1/N) to generate a frequency-divided clock signal. Using the frequency-divided clock signal as a write clock signal, the FIFO buffer 20c-4 stores the parallel data.

The clock hand-off unit 20c-5 reads out the parallel data, which has been written in the FIFO buffer 20c-4 in accordance with the frequency-divided clock signal, from the FIFO buffer 20c-4 in accordance with the system clock signal used in the local node, thereby carrying out clock hand-off. Then, the data signal is re-timed using the system clock signal.

Thus, each of the parallel data is written in the FIFO buffer 20c-4 in accordance with the frequency-divided clock signal, and then the parallel data is read out from the FIFO buffer 20c-4 in accordance with the system clock signal used in the local node, thereby performing clock hand-off. This control permits the clock signals extracted from individual optical packets to be unified into the system clock signal, making it possible to absorb bit phase shifts.

As described above, according to the present invention, the guard time between optical packets, which is needed to switch signals on the optical interconnect system, can be shortened and also communication can be performed without narrowing the effective communication bandwidth. Further, the terminal node 20 autonomously corrects the timing difference upon connection with the optical switch node 10, independently of other terminals already connected, and accordingly, the addition, replacement, etc. of terminal nodes can be carried out during in-service operation.

Also, in cases where contention occurs between the optical packets transmitted from multiple terminal nodes and the switching process of the optical switch 11, a terminal node whose transmission timing needs to be corrected is automatically detected and effective arbitration is carried out, whereby the operability and reliability of optical packet communication can be improved.

Further, the bit phase shift compensator 20c is provided to execute clock hand-off, thereby enabling bit-level phase adjustment of the individual received optical packets.

The optical transmission system of the present invention is configured such that during the initialization, the terminal node transmits an optical dummy packet to the optical switch node, then detects synchroneity of the optical dummy packet returned thereto after being switched by the optical switch node, and, if synchronization error is detected, adjusts the output timing of the optical dummy packet so that the timing of arrival of the optical dummy packet at the optical switch node may coincide with the switching timing of the optical switch node, to thereby correct the time difference between the switching timing and the arrival timing. Accordingly, even if the arrival time difference between optical packets is large, the time difference can be corrected without increasing the guard time, thus making it possible to improve the transmission efficiency of optical packets.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system for performing optical transmission, comprising:

an optical switch node including an optical switch for switching an optical packet, and a timing adjustment signal generator, responsive to reception of a timing adjustment request signal, for generating and outputting a timing adjustment signal to a node which is transmitting an optical packet at such transmission timing as to cause timeslot displacement at input ports of the optical switch; and a plurality of terminal nodes each including an optical packet transmitter for transmitting an optical packet affixed with a timestamp to the optical switch, a timestamp analyzer for receiving the optical packet switched by the optical switch to analyze continuity of the timestamp and, on detection of timeslot displacement as a result of the analysis, transmitting the timing adjustment request signal, and a timing corrector for receiving the timing adjustment signal and correcting the transmission timing of the optical packet, wherein, provided that the terminal nodes include first and second terminal nodes and a destination terminal node and that first and second optical packets transmitted from the first and second terminal nodes, respectively, are addressed to the destination terminal node, the timestamp analyzer of the destination terminal node operates, in response to reception of the first and second optical packets switched by the optical switch, to analyze continuity of the timestamps affixed to the first and second optical packets and, if timeslot displacement has occurred, to output the timing adjustment request signal, the timing adjustment signal generator operates, in response to reception of the timing adjustment request signal, to output the timing adjustment signal for correcting transmission timing displacement, to the first or second terminal node whose optical packet transmission timing is displaced on a timeslot-by-timeslot basis, and the timing corrector of the first or second terminal node corrects the optical packet transmission timing on a timeslot-by-timeslot basis, in accordance with the received timing adjustment signal.

2. The optical transmission system according to claim 1, wherein the timestamp analyzer identifies a terminal node of which the timestamp lacks continuity, as a destination node whose optical packet transmission timing is displaced on a timeslot-by-timeslot basis, and includes, in the timing adjustment request signal to be transmitted, an identifier of the identified destination node and a number of missing timestamps.

* * * * *